Patented June 8, 1943

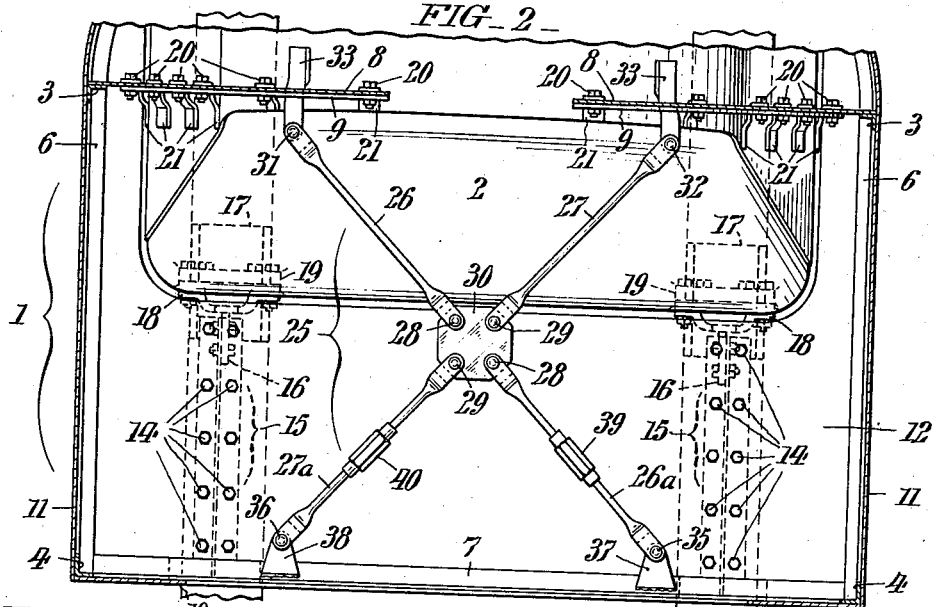

2,321,330

UNITED STATES PATENT OFFICE 2,321,330

LOCOMOTIVE CAB BRACING MEANS

Carleton K. Steins, Merion, Pa., assignor to The Pennsylvania Railroad Company, Philadelphia, Pa., a corporation of Pennsylvania Application February 14, 1942, Serial No. 430,892

5 Claims. (Cl. 105—456)

This invention relates to locomotive cab bracing means, that is to say, to means for preventing the cabs from swaying laterally incident to travel of the locomotives over track irregularities at high speeds or during the rounding of curves.

In connection with bracing means of the kind referred to I aim to secure the advantages resulting from structural simplicity; ease of application; and flexibility with capacity for adaptability and adjustment to compensate for slight dimensional variations in the cabs.

One way in which the foregoing and other objects and advantages are realized in practice will appear from the following detailed description of the attached drawing, wherein Fig. 1 is a fragmentary view partly in side elevation and partly in longitudinal section of a steam locomotive conveniently embodying the cab bracing means of my invention; and Fig. 2 is a fragmentary view in horizontal section taken as indicated by the angled arrows II—II in Fig. 1.

As herein shown, the engineer's cab, comprehensively designated by the numeral 1, is mounted rearward of the back end of the boiler 2, although this relative arrangement is not necessarily essential to my invention. The cab may be of any approved construction and in the present instance includes a skeleton frame whereof the front and rear angle iron arch members or ribs 3 and 4 are connected at the top and bottom by longitudinal angle bars 5 and 6, which bars 6 are in turn connected at their rear ends by a transverse bar 7. Secured to the front rib 3 is a wall sheet 8 whereof the inner edge is shaped to conform to the cross sectional configuration of the boiler in the plane of said sheet and reinforced by a stiffening strip 9; and to the rib 4 is secured the rear wall sheet 10 of the cab. Also supported by the skeleton frame of the cab is a shell 11 of sheet metal which is in one piece and not only provides the opposite side walls of the cab, but the roof as well. The floor sheet 12 of the cab is suitably secured to the side and cross bars 6 and 7, as are also secured together the other parts of the cab structure either by riveting or welding to form a single entity or unit. As indicated in dotted lines in Fig. 1, the sides and the top of the cab body extend somewhat forwardly of the wall sheet 8 and the cab is closed at the front end by a supplemental wall sheet 13 which is cut to fit snugly around the top and sides of the boiler 2. The cab is supported from beneath by rearward cantilever extension elements 15 bolted fast to upstanding fins 16 on the pads 17 which latter also have transverse upstanding fins 18 whereto pendent lugs 19 on the mud ring of the boiler are secured, bolts 14 being employed to secure the cab to said cantilever elements. As ordinarily, the pads 17 have the capacity to slide along the top rails of the side frames of the locomotive thereby to allow longitudinal extension and contraction of the boiler. For the sake of greater rigidity, the front wall sheet 8 of the cab structure is anchored by means of bolts 20 to a series of lug brackets 21 which are suitably arranged at intervals around the boiler shell and permanently secured thereto. The cab supporting and securing arrangement just described constitutes the subject matter of a separate patent application, Serial No 430,867 filed February 14, 1942 concurrently herewith by George D. Sprankle.

The cab bracing means with which the present invention is more especially concerned is comprehensively designated in the drawing by the numeral 25, and includes a pair of diagonally arranged tie rods which are disposed in a horizontal plane within the cab directly beneath the cab roof. As shown these tie rods are respectively formed in two sections 26, 26a and 27, 27a of which sections the inner ends are pivotally connected by bolts 28, 29 to a common center or wrist plate 30. The outer ends of the front sections 26 and 27 of the tie rods are similarly connected by means of bolts 31 and 32 to supplemental lugs 33 and 34 affixed to the boiler in symmetrically spaced relation with respect to the vertical longitudinal plane of the locomotive; and the outer ends of the rod sections 26a and 27a are likewise connected by means of pivot bolts 35 and 36 to correspondingly spaced lugs 37 and 38 permanently affixed to the rib 4 of the cab framework. The tie rod sections 26a and 27a are in turn composed of two components whereof the contiguous ends are oppositely threaded and connected by turn buckles 39 and 40.

From the foregoing it will be apparent that I have provided a simple, inexpensive and compact cab bracing means which is easily and quickly installed or removed. By virtue of the articulation of its component parts and the capacity for adjustment of certain of them for length, the brace is inherently flexible so that slight dimensional variations in different locomotive cabs and boilers can be readily compensated for.

Having thus described my invention, I claim:

1. In a locomotive, a boiler; a cab extending beyond one end of the boiler; and a flexible system of inter-connected elements for bracing the cab, said elements being disposed in a horizontal plane and including lengthwise adjustable diagonally arranged rods whereof corresponding opposite ends are pivotally attached respectively at laterally spaced points both to the boiler end and to the rear portion of the cab.

2. Locomotive cab bracing means according to claim 1, located directly beneath the cab roof.

3. In a locomotive, a boiler; a cab extending beyond the rear end of the boiler; and a flexible system of inter-connected elements for bracing the cab, said elements being disposed in a horizontal plane, and including a pair of diagonally arranged tie rods each composed of two sections with the outer ends of the forward sections pivotally attached respectively at laterally spaced points to the boiler end and the rear sections similarly attached at laterally spaced points to the rear portion of the cab, and a common center element to which the inner ends of the rod components are pivotally connected, certain of said rod components being adjustable for length.

4. In a locomotive, a boiler; a cab extending beyond the rear end of the boiler; and a flexible system of inter-connected elements for bracing the cab, said elements being disposed in a horizontal plane and including diagonally arranged tie rods each respectively composed of two sections with the front ends of the forward sections pivotally attached to the boiler end at laterally spaced points and the outer ends of the rear sections similarly connected at laterally spaced points to the rear portion of the cab, a common center element to which the inner ends of the several rod sections are pivotally connected, certain of said rod sections being themselves composed of two components with their contiguous ends oppositely threaded and connected by a turn buckle for the purposes of lengthwise adjustment.

5. In a locomotive, a boiler; a cab extending beyond the rear end of the boiler and having a framework with spaced front and rear walls joined by connecting longitudinals and the said front wall secured to the boiler; and a flexible system of inter-connected elements for bracing the cab, said elements being disposed in a horizontal plane and including diagonally arranged lengthwise adjustable rods whereof the front ends are pivotally attached respectively at laterally spaced points to the boiler end and the rear ends are similarly attached at correspondingly spaced points to the rear wall of the cab.

CARLETON K. STEINS.